United States Patent [19]

Thomason et al.

[11] Patent Number: 5,306,459
[45] Date of Patent: Apr. 26, 1994

[54] INSERT MOLDING METHOD USING A CRUSH RIB

[75] Inventors: Terry D. Thomason, Joliet; Robert L. Hamilton, Barrington, both of Ill.

[73] Assignee: Illinois Tool Works Inc., Glenview, Ill.

[21] Appl. No.: 866,318

[22] Filed: Apr. 9, 1992

[51] Int. Cl.$^5$ .................. B29C 45/14; B29C 45/16
[52] U.S. Cl. ..................... 264/266; 264/272.15; 264/272.17; 264/276
[58] Field of Search .......... 264/275, 276, 294, 328.9, 264/272.15, 272.17, 266

[56] References Cited

U.S. PATENT DOCUMENTS

| | | | |
|---|---|---|---|
| 4,314,960 | 8/1980 | Hass | 264/276 |
| 4,336,009 | 6/1982 | Wolf | 264/276 |
| 4,970,103 | 11/1990 | Wolf et al. | 264/276 |
| 5,041,902 | 8/1991 | McShane | 357/79 |

FOREIGN PATENT DOCUMENTS

| | | |
|---|---|---|
| 0188300 | 7/1986 | European Pat. Off. . |
| 0224702 | 10/1986 | European Pat. Off. . |
| 0271984 | 6/1988 | European Pat. Off. . |
| 2000719 | 1/1979 | United Kingdom . |

Primary Examiner—Jan H. Silbaugh
Assistant Examiner—A. Y. Ortiz
Attorney, Agent, or Firm—Schwartz & Weinrieb

[57] ABSTRACT

A method for encapsulating at least a portion of a heat sink insert with plastic material has been provided in which flashing has been eliminated. There is provided a heat sink insert which has a bottom surface, a shoulder portion, and a rib member formed integrally with and extending upwardly from the shoulder portion to define a crush zone. The rib member is deformed to conform with the contour of a cavity formed by the first and second mold plates so as to create a seal between the insert and the cavity. The rib member also serves to compensate for dimensional variations of the insert and the cavity.

7 Claims, 2 Drawing Sheets

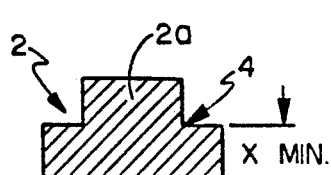
FIG. 1
PRIOR ART
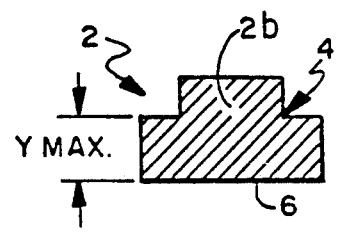
FIG. 2
PRIOR ART
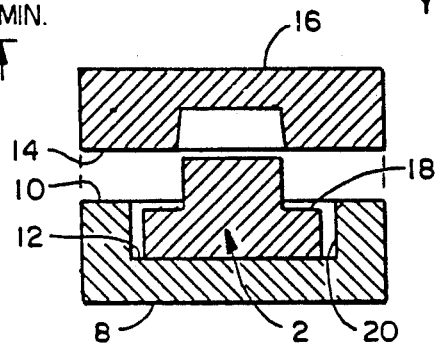
FIG. 3
PRIOR ART
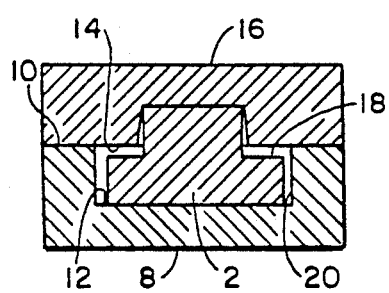
FIG. 4
PRIOR ART
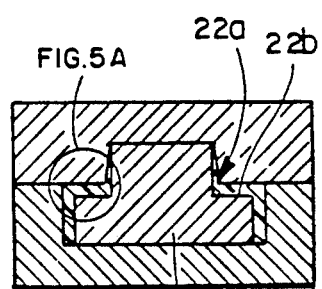
FIG. 5 PRIOR ART
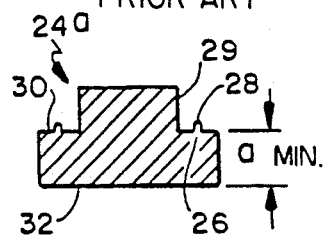
FIG. 6
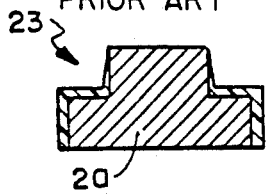
FIG. 5A PRIOR ART
FIG. 5B PRIOR ART
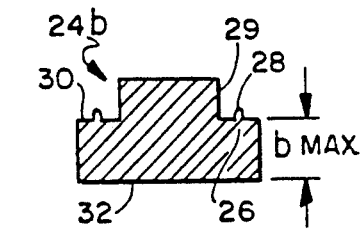
FIG. 7
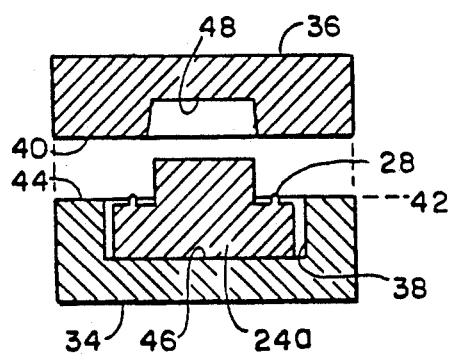
FIG. 8
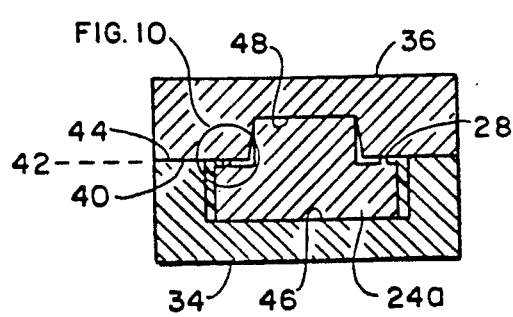
FIG. 9

INSERT MOLDING METHOD USING A CRUSH RIB

FIELD OF THE INVENTION

This invention relates generally to electronic packages and more particularly, it relates to a method of insert-molding an electronic component such as a heat sink within a mold in a manner to eliminate flashing.

BACKGROUND OF THE INVENTION

As is generally well-known, many electrical or electronic packages having semiconductor devices generate high heat dissipation which may be destructive to the semiconductor device electrical properties. In order to carry away the heat generated by semiconductor devices, the electrical or electronic package includes a heat sink member which is often desired to be encapsulated within a plastic material. It has been found that the plastic encapsulation of the heat sink member substantially reduces the cost of the final assembly.

For encapsulating in plastic by an injection insert-molding process, an upper mold plate and a lower mold plate forming a cavity therebetween is used. The heat sink insert is placed in the mold and then the two plates of the mold are closed. A molten plastic is then forced into the cavity in a well-known manner and hardened about a portion of the heat sink to form a finished plastic electronic package. Thereafter, the two plates of the mold are opened and the finished package is ejected.

The problem with this prior art technique is that during the injection stage of the process, an interference fit between the heat sink insert and the mold cavity is required. The upper mold plate and the lower mold plate are machined to very tight tolerances. However, it is more difficult to maintain the heat sink inserts to the same tight tolerances. The heat sink insert, formed with an undercut as required for mold encapsulating purposes, is not capable of being die cast within the critical molding tolerances.

If the heat sink insert is undersized, this will cause the mold cavity to have an excessive clearance so that a thin layer of the encapsulating plastic material will squirt out between the cavity and the insert in what is commonly referred to as a flashing condition. This flashing condition must then be removed by an expensive secondary machining operation, which not only increases the manufacturing costs, but may cause damage to the finished package. On the other hand, if the heat sink insert is oversized, this will cause loading into the cavity to be difficult, creating a misalignment condition leading to mold damage as well as damage to the finished package. Thus, the finished package will not be usable and must be scrapped.

In the alternative, the heat sink insert could be machined to a tight tolerance so as to be acceptable. However, this operation would also increase the manufacturing costs.

It would, therefore, be desirable to provide an improved method of encapsulating a die cast insert so as to eliminate flashing being formed on the surfaces of the insert. It would also be expedient that the method of molding compensates for dimensional variations of the insert being encapsulated.

OBJECTS OF THE INVENTION

Accordingly, it is a general object of the present invention to provide an improved method of insert-molding an electronic component such as a heat sink within a mold in a manner to eliminate flashing.

It is an object of the present invention to provide an improved method for encapsulating a component insert having a rib member which is deformable so as to create a seal between the insert and the mold cavity.

It is another object of the present invention to provide an improved method for encapsulating a component insert having a rib member which is deformable in order to compensate for dimensional variations of the insert being encapsulated.

SUMMARY OF THE INVENTION

In accordance with these aims and objectives, the present invention is concerned with the provision of a method for encapsulating at least a portion of a component insert with plastic material in a manner to eliminate flashing.

The method includes the step of providing a component insert having a bottom surface, a shoulder portion, and a rib member formed integral with and extending upwardly from the shoulder portion to define a crush zone. The component insert is inserted into a first mold plate which has a lower internal surface that engages the bottom surface of the component insert. The rib member extends above an upper opposed surface of the first mold plate.

A second mold plate which has a lower opposed surface is moved to engage the upper opposed surface of the first mold plate and the rib member is simultaneously deformed to conform to the contour of a cavity formed by the first and second mold plates so as to create a seal between the shoulder portion of the insert and the cavity. A molten plastic is then forced into the cavity. The molten plastic is cured to form a completed package in which the seal prevents the molten plastic from flashing to the surfaces of the insert. Thereafter, the second mold plate is moved away from the first mold plate so as to permit removal of the completed package from the mold.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a cross-sectional view of a prior art insert having a minimum size;

FIG. 2 is a cross-sectional view of a prior art insert having a maximum size;

FIG. 3 is a fragmentary, cross-sectional view of the insert of FIG. 1 shown in the lower mold plate prior to closing;

FIG. 4 is a fragmentary, cross-sectional view similar to FIG. 3, but illustrating the mold in the fully closed position and prior to introduction of molten plastic;

FIG. 5 is a fragmentary, cross-sectional view similar to FIG. 4, but illustrating the introduction of the molten plastic;

FIG. 5A is an enlarged view of the encircled area of FIG. 5;

FIG. 5B is a cross-sectional view of the finished encapsulated package 23 of the prior art;

FIG. 6 is a cross-sectional view of an insert having a minimum size, constructed in accordance with the principles of the present invention;

FIG. 7 is a cross-sectional view of an insert having a maximum size, constructed in accordance with the principles of the present invention;

FIG. 8 is a fragmentary, cross-sectional view of the insert of FIG. 6 shown in the lower mold plate prior to closing;

FIG. 9 is a fragmentary, cross-sectional view similar to FIG. 8, but illustrating the mold in the fully closed position and with the introduction of the molten plastic;

DESCRIPTION OF THE PREFERRED EMBODIMENT

Figure 10:
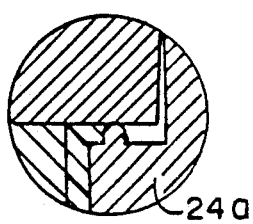
FIG. 10 is an enlarged view of the encircled area of FIG. 9.

Referring now in detail to the initial FIGS. 1 through 5B of the drawings, the prior art technique of encapsulating a portion of a typical electronic component, such as a heat sink insert 2a or 2b is shown. The insert 2 is generally formed by a die cast or other operation in which there are large dimensional variations. In other words, a vertical dimension between the shoulder or offset 4 and the bottom surface 6 of the insert will vary between a minimum size x as illustrated in FIG. 1 and a maximum size y as illustrated in FIG. 2. The shoulder 4 has been provided on the insert as required for the molding encapsulating purposes.

When the insert 2(2a) having the minimum size x of FIG. 1 is loaded into the lower mold plate 8, the distance x will be less than the dimension between upper opposed face 10 and lower face 12 of the mold plate 8 as shown in FIG. 3. As a result, when the lower opposed face 14 of the top or upper mold plate 16 is moved into engagement with the upper opposed face 10 of the bottom or lower mold plate 8, an opening or clearance 18 will be formed between the mold cavity 20 and the insert 2. This is illustrated in FIG. 4. When the molten plastic is injected into the cavity 20, a thin layer of the plastic will flow into and fill the opening 18 creating the flashing condition. As can be seen from FIGS. 5 and 5A, the respective vertical and horizontal surfaces 22a and 22b of the insert becomes coated with plastic, which is unacceptable.

After the finished encapsulated package 23 illustrated in FIG. 5B has been removed from the mold cavity 20, an expensive secondary machining operation is necessary to grind off the thin layer of plastic from the surfaces of the heat sink insert. This additional step greatly increases the cost of the finished package which reduces or eliminates the economic advantage of plastic encapsulating of the insert. Alternatively, the vertical dimension between the shoulder 4 and the bottom surface 6 of the insert could be machined so as to minimize the dimensional difference between the minimum x size and the maximum y size to an acceptable level. However, this would also increase the cost of the finished package.

A novel component insert of the present invention is shown in FIGS. 6 and 7 and comprises a die cast aluminum insert 24a (24b) including an annular shoulder area 26 for mold encapsulating purposes and a raised, bead-like rib or projection 28 formed integrally within and extending upwardly from the shoulder area 26. The bead-like rib defines a crush zone which extends continuously around the sidewall 29 of the insert at a spaced apart distance. The vertical distance between the horizontal surface 30 of the shoulder and the bottom surface 32 of the insert will have dimensional variations from a minimum size a as illustrated in FIG. 6 to a maximum size b as illustrated in FIG. 7.

Unlike the common inserts of the prior art which have been designed to create an interference fit in the mold cavity when the two mold plates closed, the present insert is designed to have a height from the bottom surface 32 to the tip of the rib 28 which is slightly greater than the internal height of the cavity in the lower mold plate.

As can be seen in FIGS. 8 through 10, there is shown a simplified diagrammatic form of a molding machine which includes a stationary lower die or mold plate 34 for receiving the component insert 24a of FIG. 6. The mold plate 34 may have locating pins (not shown) to ensure proper location of the component insert. Facing and movable upper die or mold plate 36 moves toward and away from the lower mold plate under the control of a press (not shown). Coordinated with the operation of the press is a plastic source (not shown) for selectively supplying plastic encapsulating material to the mold cavity 38 formed between the mold plates 34 and 36 when the upper mold plate 36 has been moved so that its opposed lower face 40 has reached dotted line 42 and has formed abutting engagement with the opposed upper face 44 of the lower mold plate. The mold cavity 38 is defined between the lower surface 46 of the lower mold plate 34 on which the insert 24a is disposed and the upper surface 48 of the upper mold plate 36.

With particular reference to FIG. 8 of the drawings, it will be noted that prior to closing of the lower and upper plates 34 and 36 the rib 28 initially extends above the dotted line 42 which is slightly greater than the internal height of the lower mold plate 34 defined between its lower surface 46 and its opposed upper surface 44. When the movable upper mold plate 36 is forced against the opposed upper surface 44 as a result of a clamping action by the press, the rib 28 is collapsed or deformed by the movement of the upper mold plate 36 as illustrated in FIGS. 9 and 10.

Figure 10A:
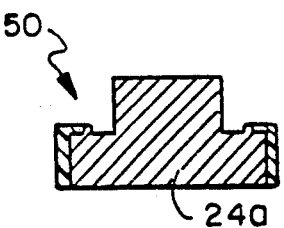
FIG. 10A is a cross-sectional view of the finished encapsulated package 50 of the present invention.
Figure 11:
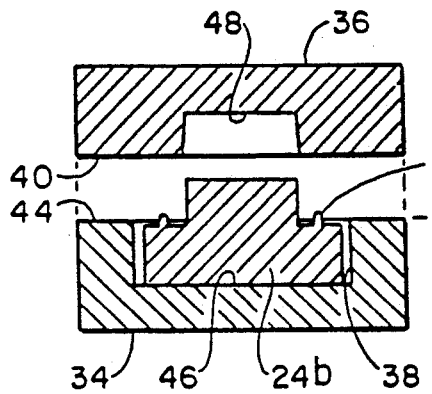
FIG. 11 is a fragmentary, cross-sectional view of the insert of FIG. 7 shown in the lower mold plate prior to closing.
Figure 12:
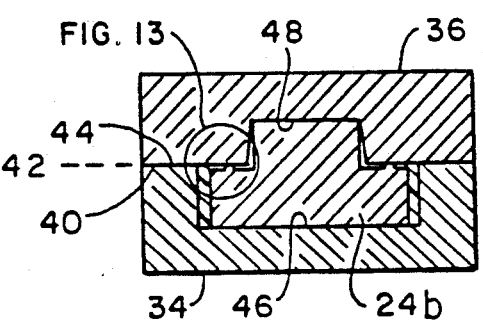
FIG. 12 is a fragmentary, cross-sectional view similar to FIG. 11, but illustrating the mold in the fully closed position and with the introduction of the molten plastic.

After the movable upper mold plate 36 is closed, fluid plastic material is forced into the mold cavity 38 and is then cured or hardened in a known manner. The collapsed rib acts as a seal to prevent the molten plastic from flashing between the insert 24a and the mold cavity 38 which would require the finished package to be reworked or scrapped. Thus, no plastic penetrates onto the surfaces of the insert. After the plastic has hardened, the mold is opened and the finished package 50 of FIG. 10A is removed.

It should be noted that the clamping action by the press determines the internal height of the lower mold plate 34 irrespective of the dimensional variations of the component inserts 24a and 24b illustrated in FIGS. 6 and 7. In other words, the dimension of the insert will conform to the mold cavity 38 defined between the mold plates 34 and 36 which are machined to high tolerances. Therefore, the crushed rib serves to compensate for any dimensional variations in the inserts as well as possible height differences of the mold cavities.

It is an important feature that the rib 28 be made of a reduced strength such that the pressure clamping force of the mold press will always cause the rib to deform so as to allow the insert to conform to the contour of the mold cavity 38. The completed electronic package or insert molded product 50 made in the novel sequence of operational steps of FIGS. 6–10 is illustrated in FIG. 10A.

In FIGS. 11–13A, there are shown the sequence of steps of the molding operation and the completed package or insert molded product 52 similar to FIGS. 8–10A when the insert 24b of FIG. 7 is loaded into a lower mold plate 34. Thus, the molding process is identical to that described above with respect to FIGS. 8–10 and will not be repeated. However, it will be noted that the rib 28 in the FIG. 13 has been deformed more than what is shown in FIG. 10. The rib in FIG. 10 has been deformed a minimal amount referred to as "minimum crush," and the rib in FIG. 13 has been deformed a maximum amount referred to as a "maximum crush." It should be apparent to those skilled in the art that the actual amount of deformation of the rib in each instance is dependent upon the variation of the dimensions of the insert so as to compensate for the same.

Figure 13:
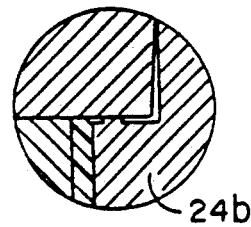
FIG. 13 is an enlarged view of the encircled area of FIG. 12.
Figure 13A:
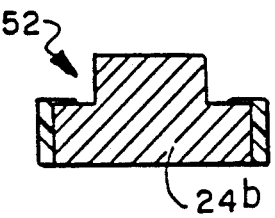
FIG. 13A is a cross-sectional view of the finished encapsulated package 52 of the present invention.

The completed encapsulated package 23 of the prior art in FIG. 5B should be compared with the completed insert packages 50 and 52 of the present invention in respective FIGS. 10A and 13A. It can be seen that the finished packages 50 and 52 do not have any flashing. As a result, the subsequent costly machining step of grinding off the plastic material or prior machining, as required for the finished insert package 23 for FIG. 5B, has been eliminated to thereby reduce manufacturing costs.

Figure 14:
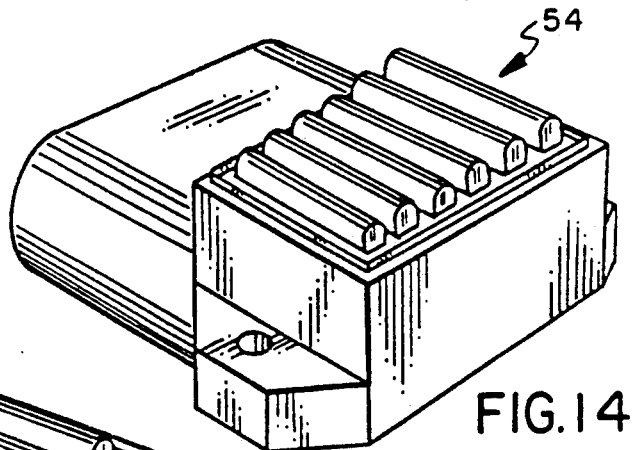
FIG. 14 is a perspective view of a heat sink insert used in the method of the present invention.
Figure 15:
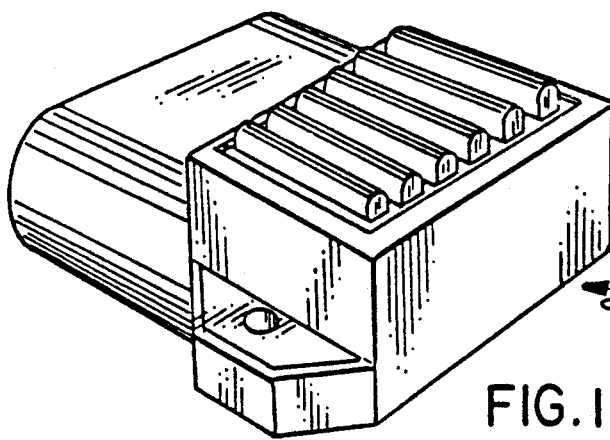
FIG. 15 is a perspective view of a completed heat sink package constructed by the novel method of the present invention.

FIG. 14 is a perspective view of a heat sink insert 54 used in the method of the present invention. An encapsulated heat sink package 56 constructed by the novel method of the present invention is illustrated in FIG. 15. While the heat sink insert 54 is preferably made of a die cast aluminum insert, it should be clearly understood that the insert can be produced by other cast, machined and molded operations such as screw machined, injection molded, upset stamping, and the like. Further, it should be appreciated that the actual shape of the crush rib may have any design other than semicircular as illustrated. Particularly, the rib may have a round, oval, rectangular or any other desired geometric configuration. Moreover, the rib member may be formed as a segment or a plurality of segments rather than being continuous around the sidewall of the insert.

From the foregoing detailed description, it can thus be seen that the present invention provides an improved method for encapsulating at least a portion of a component insert with plastic material in a manner to eliminate flashing. The method of the present invention includes a component insert having a rib member which is deformable to conform to the contour of mold cavity so as to create a seal between the insert and the cavity. The deformable rib also serves to compensate for dimensional variations of the insert and the cavity.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A method for encapsulating at least a laterally outward portion of a component insert with plastic material in a manner to eliminate the creation of flashing upon a laterally inward portion of said component insert, comprising the steps of:

providing a mold having first and second mold plates, said first mold plate having a cavity for receiving a component insert, a lower internal surface for supportably engaging a bottom surface of said component insert when said component insert is inserted into said cavity of said first mold plate, and an upper surface for matably engaging a lower surface of said second mold plate;

providing a component insert having a bottom surface and a top surface, and providing a deformable rib member upon said top surface of said component insert such that said deformable rib member is integral with and extends upwardly from said top surface of said component insert, between laterally outward and laterally inward portions of said top surface, so as to project upwardly a first predetermined amount beyond said upper surface of said first mold plate when said component insert is inserted into said cavity of said first mold plate;

inserting said component insert into said cavity of said first mold plate such that said lower internal surface of said first mold plate engages said bottom surface of said component insert, and said rib member of said component insert extends above said upper surface of said first mold plate by said first predetermined amount while said top surface of said component insert is disposed below said upper surface of said first mold plate;

moving said second mold plate such that said lower surface of said second mold plate engages said upper surface of said first mold plate so as to close said mold and define a mold cavity between said component insert and said mold plates, said lower surface of said second mold plate thereby deforming said rib member of said component insert so that the deformed rib member extends a second predetermined amount above said top surface of said component insert and thereby creates a seal barrier in said mold cavity between said laterally outward and said laterally inward portions of said top surface of said component insert, said lower surface of said second mold plate remaining spaced above said laterally outward and laterally inward portions of said top surface of said component insert;

forcing a molten plastic material into said mold cavity, defined between said component insert and said first and second mold plates, at a position laterally outward of said seal barrier so as to encapsulate a laterally outward portion of said component insert, including said laterally outward portion of said top surface, said barrier seal preventing said molten plastic material from flashing toward said laterally inward portion of said top surface of said component insert;

curing said molten plastic material so as to form a molded encapsulated component insert product; and moving said second mold plate away from said first mold plate so as to permit removal of said molded encapsulated component insert product from said cavity of said first mold plate.

2. A method as claimed in claim 1, wherein said component insert is formed of a die cast aluminum.

3. A method as claimed in claim 1, wherein said deformed rib member serves to compensate for dimensional variations of the insert and the cavity.

4. A method as claimed in claim 1, wherein said rib member comprises a raised, bead-like projection.

5. A method as set forth in claim 1, wherein
said component insert comprises an electronic component.

6. A method as set forth in claim 5, wherein:
said electronic component comprises a heat sink.

7. A method as set forth in claim 1, wherein:
said top surface of said component insert comprises a shoulder portion of said component insert.

* * * * *